UNITED STATES PATENT OFFICE.

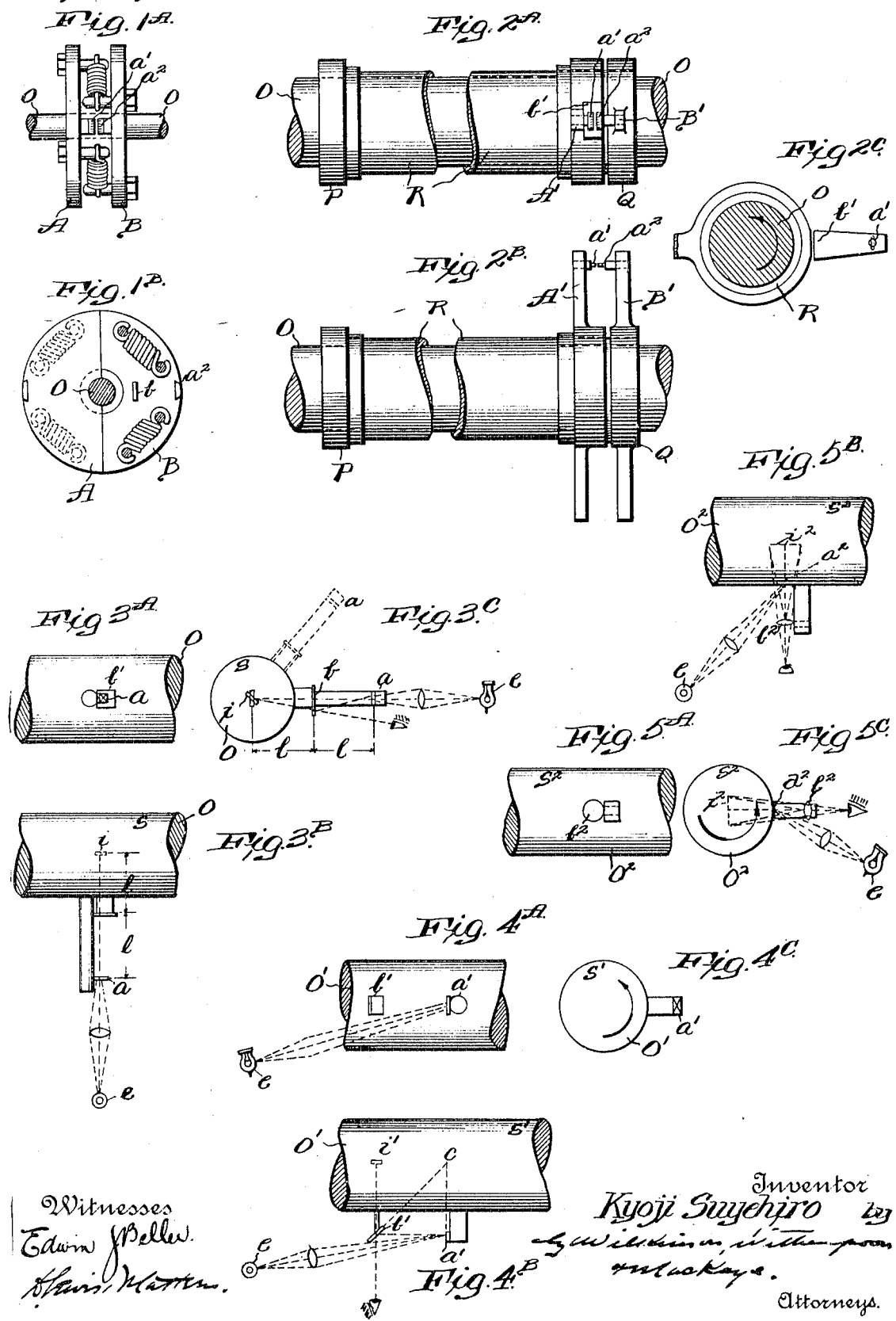

KYOJI SUYEHIRO, OF TOKYO, JAPAN.

TRANSMISSION-DYNAMOMETER FOR DIRECT OBSERVATION.

1,105,382.      Specification of Letters Patent.      Patented July 28, 1914.

Application filed February 7, 1913. Serial No. 746,858.

*To all whom it may concern:*

Be it known that I, KYOJI SUYEHIRO, a subject of the Emperor of Japan, residing at No. 10 Nishikata Machi, Hongo-Ku, Tokyo, Empire of Japan, have invented certain new and useful Improvements in Transmission-Dynamometers for Direct Observation; and I do hereby declare the following to be a full, clear, and exact description of the invention, such as will enable others skilled in the art to which it appertains to make and use the same.

This invention is to make transmission dynamometers directly observable by forming the image of scale or indicator which indicates an amount of twist in or near the center of a shaft by means of mirrors or lenses which are fitted in proper positions. As the image is formed in or near the center it remains always in the center during the revolution of the shaft, the only motion being self-revolution. Therefore the image is practically at rest for the range of observation, and can be observed just like a scale or indicator on a fixed shaft. Its object is to make the scale or indicator indicating the amount of twist of transmission dynamometer directly observable by a simple method and thereby to simplify the construction of transmission dynamometers.

It is a well known law of physics that if an object be placed before a mirror a virtual image of that object will seem to appear as far behind the mirror as the object is distant therefrom, and also that a lens may be so disposed relatively to an object, that a similar image will be caused to appear at a predetermined distance from the lens, dependent upon the varying focal distance.

The broad object of the present invention, therefore, is to mount an optical element (such as a mirror, prism, or lens) relatively to an indicator or scale, mounted on and rotating with a shaft, so as to cause a virtual image of the indicator or scale to seemingly appear substantially at the axis of rotation of said shaft, whereby the image is practically at rest during the time of observation.

With these objects in view the invention consists in the arrangement and combination of parts hereinafter referred to, the particular features of novelty being pointed out more succintly in the appended claims.

To more fully understand the invention reference is had to the accompanying drawings illustrating a practical embodiment of the same, in which drawings like characters designate the same or equivalent parts in the several views, and in which—

Figure $1^A$ is an edge view in elevation, showing a spring transmission dynamometer fitted with the present invention. Fig. $1^B$ is a view in side elevation of the same, one-half of one of the disks being broken away, showing a pair of the springs in elevation, and also showing the relative positions of the scale and mirror. Fig. $2^A$ is a plan view showing a modified construction for indicating the torsional stress between two positions on a shaft. Fig. $2^B$ is a view in elevation taken at right angles to Fig. $2^A$. Fig. $2^C$ is a cross sectional view through the shaft, at a position substantially between the pair of scales, and showing the position of one of the scales relatively to the shaft. Fig. $3^A$ is a plan view, Fig. $3^B$ is an elevational view and Fig. $3^C$ is an end view, illustrating diagrammatically a modified arrangement, in which the scale is illuminated by the reflection from the mirror of a suitable light such as an electric lamp. Fig. $4^A$ is a plan view, Fig. $4^B$, an elevational view, and Fig. $4^C$ an end view illustrating a modified arrangement in which a mirror or prism is arranged obliquely to the shaft, and also showing the scale directly illuminated by a suitable light, and Fig. $5^A$ is a plan view, Fig. $5^B$ an elevational view, and Fig. $5^C$ an end view, showing a further modified form in which the scale is disposed between the shaft and a lens, the same being so positioned relatively to each other that a virtual image of the scale is caused to be so projected as to apparently be seen at a position substantially at the axis of rotation of said shaft. In these views, the scale is also shown as being directly illuminated by a lamp.

As shown in Fig. 1 the amount of twist between two circular disks (A) and (B) of a spring transmission dynamometer can, for instance, be indicated by a pair of scales $(a_1)$ and $(a_2)$. But they are not observable while the shaft is running. For the purpose of making the scales observable, the images of the scales are formed in or near the center of the shaft by means of a mirror $(b_1)$ fitted just or nearly midway between the scales $(a_1)$ and $(a_2)$ and the center of the shaft $(o\ o)$ and parallel to the center line of the shaft.

In the torsionmeter which is shown in Fig. 2 the twist between two points (P) and (Q) is indicated, for instance, by a pair of scales ($a^1_1$) and ($a^1_2$), one of the scales ($a^1_1$) being mounted on a projecting arm ($A^1$) which is fixed at a point (P) by means of a tube (R), and the other scale ($a^1_2$) being mounted on the other projecting arm ($B^1$) which is directly fixed to the shaft at a point (Q). To make the scales observable, a mirror ($b^1$) is fitted just in the same manner as before.

In Fig. 3 the arrangement is shown diagrammatically. In the figure, (a) is a scale or an indicator and (b) a mirror. As described in the foregoing paragraphs, the mirror (b) is fitted just or nearly midway between the scale (a) and the center of the shaft (o) in order that the image of the scale or indicator (i) be formed in or near the center of the shaft. Though the scale or indicator (a) itself changes its position while revolving, its image (i) remains in the center of the shaft, the only motion being self-revolution. If the size of the mirror (b) is not large the observable range during which the scale is reflected into the eyes of an observer by the mirror is very small. As shown in (C) of Fig. 3, when the shaft turns by a sufficiently large angle ($\theta$) the image takes a position ($i\theta$) where the reflected rays of the scale can no more enter into the eyes. Thus, as the image (i) seems as if it were at rest during a small range and this is repeated at each revolution successively, the image (i) seems like a fixed scale or indicator and can easily be observed. If the scale (a) is well illuminated by an electric lamp (e) the image appears very distinctly. In the above arrangement it is necessary, that the distance of the scale or indicator (a) from the surface of the shaft is longer that the radius of the shaft. If not, the image can not be formed in the center of the shaft. Referring to Fig. 4, in the case where this construction is not desirable a scale or indicator ($a^1$) indicating twist is placed normal to the direction of the shaft ($o'$ $o'$) and a mirror (a prism may be used in lieu of the mirror) is fitted obliquely to the shaft. As shown in the figure the obliquity (angle $o^1$ $c$ $b^1$) is so adjusted according to the positions of the scale ($a^1$) and the mirror ($b^1$) that the image ($i'$) of the scale or indicator ($a'$) falls in or near the center of the shaft ($o'$ $o'$). Then it is evident that the image is observable just as in the foregoing arrangements.

So far, the arrangements for a mirror having plane surface have been described for the sake of simplifying the explanation. In actual cases, however, it need not necessarily be a plane mirror, the surface of the mirror may be curved. Then in an arrangement as shown in Fig. 3, the mirror is not fitted in the middle of the distance between the scale or indicator (a) and the center of the shaft (o o) but at a proper position between them, according to the curvature of the surface of the mirror to form the image in or near the center of the shaft. If the arrangement be as shown in Fig. 4 the position of the mirror and its obliquity (angle $o'$ $c$ $b'$) are so adjusted according to the curvature of the surface of the mirror, that the image ($i'$) is formed in or near the center of the shaft. Again, if, according to the construction of a dynamometer, a mirror can not be fitted between the scale or indicator and the center of the shaft or on the side of the scale, a lens ($b''$) is fitted outside the scale or indicator ($a''$). (Refer to Fig. 5). The position of the lens ($b''$) is so adjusted, according to the position of the scale or indicator ($a''$) as to form the image ($i''$) in or near the center of the shaft.

Claims:

1. In a transmission dynamometer for indicating the torsional stress on a shaft, the combination of indicating means mounted on and rotating with the shaft, and an optical element mounted on the shaft and coöperating with said indicating means to cause a virtual image of said indicating means to appear substantially at the axis of rotation of said shaft.

2. In a transmission dynamometer for indicating the torsional stress on a shaft, the combination of indicating means carried by said shaft, and an optical element carried by said shaft and disposed between said shaft and said indicating means and so positioned relatively thereto as to receive the rays of light from said indicating means and cause a virtual image of said indicating means to appear substantially at the axis of rotation of said shaft.

3. In a transmission dynamometer for indicating the torsional stress on a shaft, the combination of an indicating element carried by the shaft, an optical element carried by the shaft, and coöperating with said indicating element to cause a virtual image of said indicating element to appear substantially at the axis of rotation of said shaft, and means for illuminating one of said elements to cause the image to appear more clearly.

In testimony whereof, I affix my signature, in presence of two witnesses.

KYOJI SUYEHIRO.

Witnesses:
F. NEGISHI,
GENJI KUTIBARA.